US010995811B2

(12) United States Patent
Watanabe et al.

(10) Patent No.: US 10,995,811 B2
(45) Date of Patent: May 4, 2021

(54) COIL SPRING

(71) Applicant: NHK SPRING Co., Ltd., Yokohama (JP)

(72) Inventors: Toshinori Watanabe, Yokohama (JP); Hidemasa Ito, Yokohama (JP); Noritoshi Takamura, Yokohama (JP); Fumio Yamamoto, Yokohama (JP); Fumio Takahashi, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 46 days.

(21) Appl. No.: 16/088,665

(22) PCT Filed: Mar. 30, 2017

(86) PCT No.: PCT/JP2017/013172
§ 371 (c)(1),
(2) Date: Sep. 26, 2018

(87) PCT Pub. No.: WO2017/170833
PCT Pub. Date: Oct. 5, 2017

(65) Prior Publication Data
US 2019/0113094 A1    Apr. 18, 2019

(30) Foreign Application Priority Data
Mar. 31, 2016  (JP) .............. JP2016-073519

(51) Int. Cl.
F16F 1/04    (2006.01)
F16F 1/06    (2006.01)

(52) U.S. Cl.
CPC .............. F16F 1/047 (2013.01); F16F 1/06 (2013.01); F16F 2234/02 (2013.01); F16F 2238/026 (2013.01)

(58) Field of Classification Search
CPC ........ F16F 1/04; F16F 3/04; F16F 1/06; F16F 1/042; F16F 1/045; F16F 1/043; F16F 15/13492; B60G 2202/12; B60G 2202/312
See application file for complete search history.

(56) References Cited

U.S. PATENT DOCUMENTS 4,810,231 A * 3/1989 Weissenberger ........ F16F 1/043
                                                      192/203
5,464,198 A * 11/1995 Yanko ....................... F16F 1/06
                                                      267/167

(Continued)

FOREIGN PATENT DOCUMENTS

CN    101534976 A    9/2009
JP     55072931 A    6/1980

(Continued)

OTHER PUBLICATIONS

SIPO First Office Action corresponding to Application No. 201780019635.8; dated Aug. 1, 2019.

(Continued)

Primary Examiner — Bradley T King
Assistant Examiner — Mahbubur Rashid
(74) Attorney, Agent, or Firm — Cantor Colburn LLP

(57) ABSTRACT

The present invention provides a coil spring, in which a corresponding portion is provided at an end portion in a direction of a coil axis, the corresponding portion having a whole size in the direction of the coil axis of the plurality of wire materials adjacent to each other in the direction of the coil axis equal to a maximum value of a gap in the direction of the coil axis between wire materials adjacent to each other in the direction of the coil axis of the coil spring, a gap in the direction of the coil axis between the corresponding portion and a wire material adjacent to the corresponding portion on an inner side in the direction of the coil axis is (Continued)

smaller than a wire height in an active coil portion of the coil spring, and at the end portion of the direction of the coil axis, a gap in the direction of the coil axis between a portion extending around the coil axis from the corresponding portion to a distal end portion side of the wire material and a wire material adjacent to the portion on the inner side in the direction of the coil axis gradually decreases from the corresponding portion toward the distal end portion side of the wire material around the coil axis.

5 Claims, 3 Drawing Sheets

(56) References Cited

U.S. PATENT DOCUMENTS

| | | | | |
|---|---|---|---|---|
| 6,119,769 | A * | 9/2000 | Yu | F28D 1/0475 |
| | | | | 138/38 |
| 6,145,762 | A * | 11/2000 | Orloff | F02M 57/023 |
| | | | | 239/533.2 |
| 9,822,751 | B2 * | 11/2017 | Vezzani | F02M 63/0265 |
| 2004/0046297 | A1 | 3/2004 | DeMoss et al. | |
| 2006/0061024 | A1 * | 3/2006 | Jung | F16F 15/067 |
| | | | | 267/167 |
| 2009/0230602 | A1 * | 9/2009 | Takamura | F16F 1/06 |
| | | | | 267/174 |
| 2010/0248079 | A1 * | 9/2010 | Kinouchi | C21D 6/002 |
| | | | | 429/513 |
| 2012/0186027 | A1 | 7/2012 | Gladney et al. | |
| 2016/0069313 | A1 * | 3/2016 | Vezzani | F02M 63/0265 |
| | | | | 123/456 |

FOREIGN PATENT DOCUMENTS

| | | | | |
|---|---|---|---|---|
| JP | 56124337 | U | | 9/1981 |
| JP | 62017436 | A | * | 1/1987 ............... F16F 1/042 |
| JP | 62028533 | A | * | 2/1987 ............... F16F 1/043 |
| JP | 62155342 | A | | 7/1987 |
| JP | 04126044 | U1 | | 11/1992 |
| JP | 11107504 | A | | 4/1999 |
| JP | 2007315425 | A | | 12/2007 |
| WO | 2008143595 | A1 | | 11/2008 |

OTHER PUBLICATIONS

International Search Report corresponding to Application No. PCT/JP2017/013172; dated Jul. 4, 2017.

* cited by examiner

COIL SPRING

CROSS REFERENCE TO RELATED APPLICATIONS

This is the U.S. national stage of application for International Application No. PCT/JP2017/013172, filed on Mar. 30, 2017. Priority under 35 U.S.C. § 119(a) and 35 U.S.C. § 365(b) is claimed from Japanese Application No. 2016-073519, filed on Mar. 31, 2016, the disclosures all of which are also incorporated herein by reference.

TECHNICAL FIELD

The present invention relates to a coil spring.
Priority is claimed on Japanese Patent Application No. 2016-073519, filed Mar. 31, 2016, the content of which is incorporated herein by reference.

BACKGROUND ART

In related art, a coil spring formed by winding a wire member around a coil axis has been widely used.

In this type of coil spring, when a plurality of coil springs are accommodated together at random, the coil springs become entangled with each other, and for example, there is a possibility of reduction in production efficiency.

In the coil spring shown in the following Patent Document 1, a plurality of densely winding portions formed by abutting or approaching wire members in a direction of the coil axis are provided. This prevents the densely winding portion from entering a gap (hereinafter referred to as a wire member gap) in the direction of the coil axis between the wire members adjacent to each other in the direction of the coil axis of another coil spring.

CITATION LIST

Patent Document

[Patent Document 1] Japanese Unexamined Patent Application, First Publication No. H4-126044

SUMMARY OF INVENTION

Technical Problem

However, in the coil spring disclosed in Patent Document 1, a long wire material is required, and the weight or costs thereof become high.

The present invention has been made in consideration of such circumstances, and an object thereof is to provide a coil spring capable of preventing mutual entanglement without increasing the weight or the cost.

Solution to Problem

According to an aspect of the present invention, there is provided a coil spring formed by winding a wire material around a coil axis, in which a corresponding portion is provided at an end portion in a direction of the coil axis, the corresponding portion having a whole size in the direction of the coil axis of the plurality of wire materials adjacent to each other in the direction of the coil axis equal to a maximum value of a gap in the direction of the coil axis between wire materials adjacent to each other in the direction of the coil axis of the coil spring, a gap in the direction of the coil axis between the corresponding portion and a wire material adjacent to the corresponding portion on an inner side in the direction of the coil axis is smaller than a wire height in an active coil portion of the coil spring, and at the end portion in the direction of the coil axis, a gap in the direction of the coil axis between a portion extending around the coil axis from the corresponding portion to a distal end portion side of the wire material and a wire material adjacent to the portion on the inner side in the direction of the coil axis gradually decreases from the corresponding portion toward the distal end portion side of the wire material around the coil axis.

According to the present invention, the gap (hereinafter referred to as a wire material gap) in the direction of the coil axis between the corresponding portion and the wire material adjacent to the corresponding portion on the inner side in the direction of the coil axis is smaller than the wire height in the active coil portion. Therefore, even if the corresponding portion of one coil spring intends to enter the wire material gap of the other coil spring, the wire material in the active coil portion of the other coil spring interferes with at least one of the corresponding portion of the one coil spring and the wire material of the one coil spring adjacent to the corresponding portion on the inner side in the direction of the coil axis.

This makes it possible to prevent the wire material in the active coil portion of the other coil spring from entering the wire material gap in the one coil spring between the corresponding portion and the wire material adjacent to the corresponding portion on the inner side in the direction of the coil axis. As a result, it is possible to prevent the wire material in the active coil portion of the other coil spring from being strongly caught by the wire materials of the one coil spring from both sides in the direction of the coil axis, and from being hard to extract.

Thus, it is possible to prevent occurrence of entanglement of the coil springs, for example, without increasing the length of the wire material and forming a plurality of densely winding portions or the like on the coil spring.

Here, the coil spring may be a closed end spring in which the distal end portion of the wire material overlaps the wire material adjacent to the distal end portion on the inner side in the direction of the coil axis, and the corresponding portion may be formed by a pair of wire materials adjacent to each other in the direction of the coil axis.

In this case, since the closed end spring is provided, the above-described actions and effects are significantly achieved. Further, since the corresponding portion is formed by a pair of wire materials adjacent to each other in the direction of the coil axis, the length of the wire material can be reliably reduced.

Advantageous Effects of Invention

According to the coil spring according of the present invention, mutual entanglement can be prevented without increasing the weight or the cost.

DESCRIPTION OF EMBODIMENTS

As a result of intensive studies by the present inventors, the following findings were found.

Figure 3:
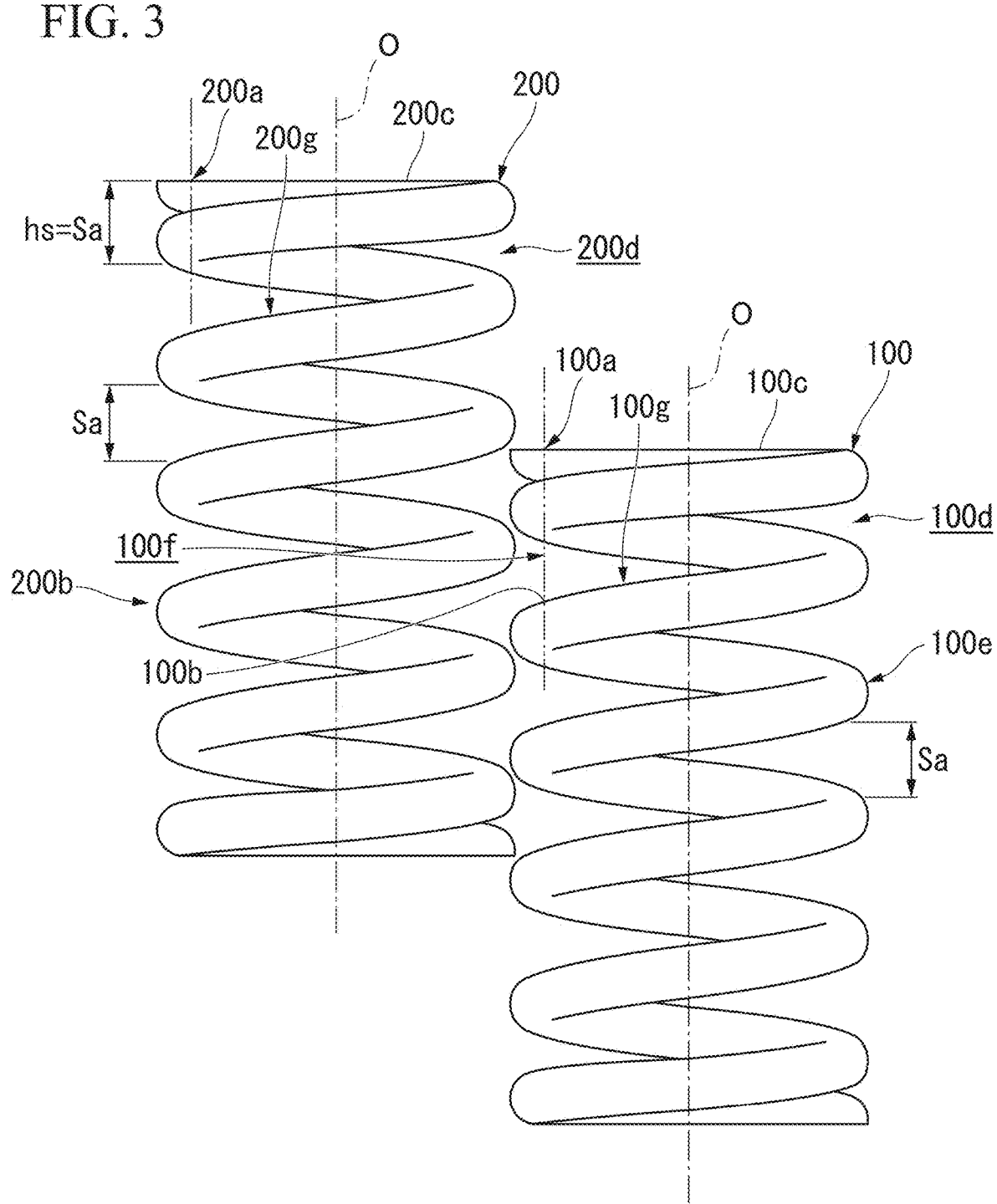
FIG. 3 is a side view of a conventional coil spring.

In conventional coil springs 100 and 200 shown in FIG. 3, corresponding portions 100a and 200a are provided at end portions in a direction of the coil axis O of the coil springs 100 and 200, and the corresponding portions 100a and 200a have a whole size hs of the plurality of wire materials adjacent to each other in the direction of the coil axis O equal to a maximum value Sa of a gap between the wire materials in the coil springs 100 and 200. In the shown example, the coil springs 100 and 200 are closed end springs in which pitches in active coil portions 100e and 200b are equal. Therefore, the maximum value Sa of the wire material gap is equal over substantially the entire region of the active coil portions 100e and 200b.

The corresponding portion 100a of one coil spring 100 enters the wire material gap of the other coil spring 200. Along with this, the wire material in the active coil portion 200b of the other coil spring 200 enters the wire material gap 100f between the corresponding portion 100a of the one coil spring 100 and the wire material 100b adjacent to the corresponding portion 100a on the inner side in the direction of the coil axis O.

In this case, at the end portions of the coil springs 100 and 200 in the direction of the coil axis O, a wire material gap 100d or 200d formed between a portion extending from the corresponding portion 100a or 200a toward the end portion 100c or 200c of the wire material around the coil axis O and the adjacent wire material 100g or 200g on the inner side in the direction of the coil axis O gradually decrease from the corresponding portion 100a or 200a toward the distal end portion 100c or 200c of the wire material around the coil axis O. Therefore, the wire material of the other coil spring 200 tends to deeply enter the wire material gap 100d in the one coil spring 100. Moreover, once the wire material enters in this way, the wire material of the other coil spring 200 is strongly caught by the wire materials of the one coil spring 100 from both sides in the direction of the coil axis O, and is hard to extract. In this way, entanglement of the coil springs 100 and 200 occurs.

Figure 1:
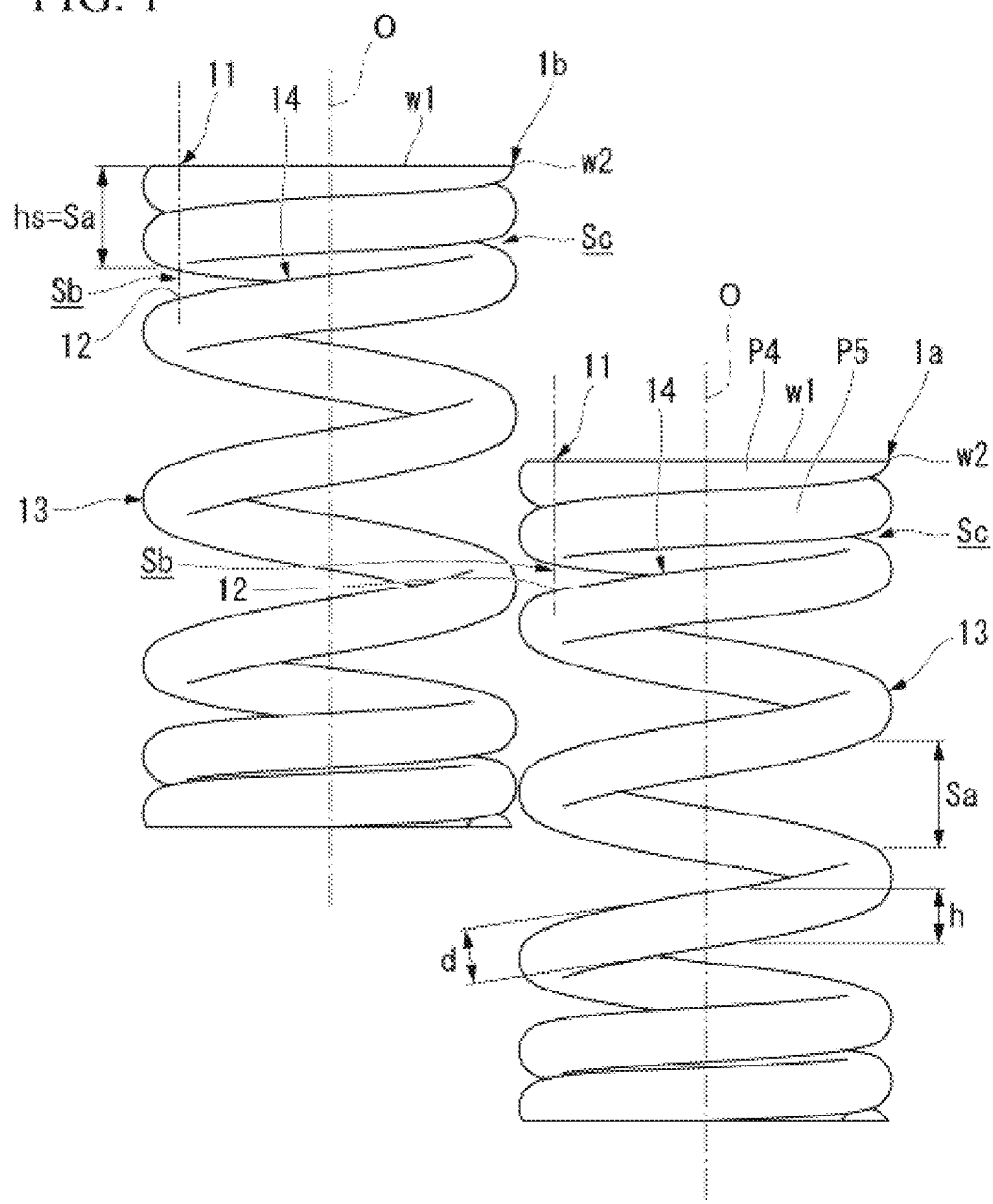
FIG. 1 is a side view of a coil spring according to an embodiment of the present invention.
Figure 2:
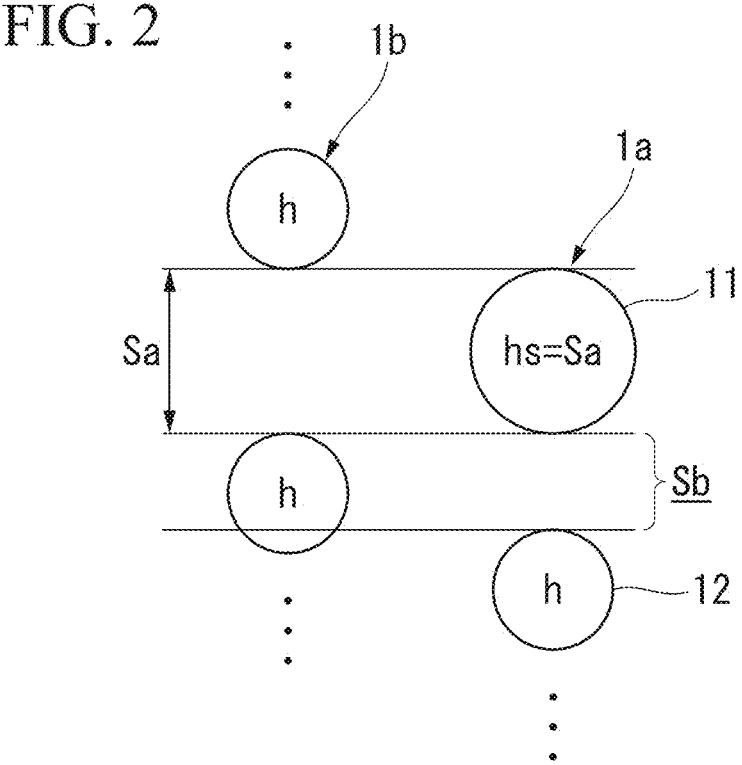
FIG. 2 is a schematic view of the coil spring shown in FIG. 1.

A coil spring according to the present invention was prepared in view of the above findings. Hereinafter, an embodiment of the coil spring according to the present invention will be described with reference to FIGS. 1 and 2.

Each of the coil springs 1a and 1b of the present embodiment is formed by continuously winding a wire material a plurality of times around the coil axis O. The coil springs 1a and 1b are made of, for example, a metal material or the like.

In the shown example, the outer diameter of each of the coil springs 1a and 1b is equal over the entire length in the direction of the coil axis O. The wire material of an active coil portion 13 is formed in a circular shape in a cross-sectional view orthogonal to the central axis line thereof. The outer diameter of the wire material in the active coil portion 13 is equal over the entire length. The coil springs 1a and 1b are closed end springs in which a distal end portion w1 of the wire material abuts and overlaps a wire material adjacent to the distal end portion w1 on the inner side in the direction of the coil axis O. A flat surface extending in a horizontal direction orthogonal to the direction of the coil axis O and facing the outer side in the direction of the coil axis O is formed at the distal end portion w1 of the wire material by, for example, grinding.

A coil spring of an open end may be adopted in place of the closed end. Further, the cross-sectional shape of the wire material may be made equal over the entire length including the distal end portion w1.

A gap (hereinafter referred to as wire material gap) in the direction of the coil axis O between mutually adjacent wire materials in the direction of the coil axis O is a maximum at a central portion in the direction of the coil axis O of the coil springs 1a and 1b, and gradually decreases toward the outer side in the direction of the coil axis O. Note that a coil spring of equal pitch in which the wire material gap is equal over the entire region except both end portions in the direction of the coil axis O of the coil springs 1a and 1b may be adopted. In the shown example, a portion (a fourth portion P4) of the wire material between a distal end edge w2 to about 180° therefrom around the coil axis O abuts and overlaps a portion (a fifth portion P5) of the wire material adjacent to the fourth portion P4 on the inner side in the direction of the coil axis O. Only the portion of the wire material between the distal end edge w2 to about 180° therefrom around the coil axis O abuts and overlaps the adjacent wire material on the inner side in the direction of the coil axis O, and other portions are separated, in the direction of the coil axis O, from the adjacent wire material on the inner side in the direction of the coil axis O. Note that a portion of the wire material from the distal end edge w2 to about 180° or more therefrom around the coil axis O may abut and overlap the adjacent wire material on the inner side in the direction of the coil axis O.

In the present embodiment, a corresponding portion 11 is provided at each of the end portions of the coil springs 1a and 1b in the direction of the coil axis O, and the corresponding portion 11 has a whole size hs in the direction of the coil axis O of the plurality of wire materials adjacent to each other in the direction of the coil axis O equal to a maximum value Sa of the wire material gap in the coil springs 1a and 1b. In the shown example, the corresponding portion 11 includes a pair of wire materials adjacent to each other in the direction of the coil axis O. The corresponding portion 11 may include three or more wire materials adjacent to each other in the direction of the coil axis O.

A part of an end surface in the direction of the coil axis O of the coil springs 1a and 1b is included in the corresponding portion 11. That is, an outer end edge of the corresponding portion 11 in the direction of the coil axis O is located between the distal end edge w2 of the wire material and a portion 360° away from the distal end edge w2 around the coil axis O, that is, between the distal end edge w2 to the portion of 1.0 turn away therefrom.

The corresponding portion 11 is located between the distal end edge w2 of the wire material and a portion about 540° away from the distal end edge w2 around the coil axis O, that is, between the distal end edge w2 to the portion of about 1.5 turn away therefrom.

In the shown example, in the corresponding portion 11, a portion of the wire material which is a little less than 180° away from the distal end edge w2 around the coil axis O, and a portion of the wire material which is a little less than 540° away from the distal end edge w2 around the coil axis O abut and overlap each other in the direction of the coil axis O. That is, in the corresponding portion 11, the portion of the wire material of a little less than 0.5 turn away from the distal end edge w2 and the portion of the wire material of a little less than 1.5 turn away from the distal end edge w2 abut and overlap each other in the direction of the coil axis O.

A wire material gap Sb (hereinafter referred to as a direct below gap) between the corresponding portion 11 and the wire material 12 adjacent to the corresponding portion 11 on the inner side in the direction of the coil axis O (on the central portion side in the direction of the coil axis O) is smaller than a wire height h in the active coil portion 13 of the coil springs 1a and 1b.

The wire height h is a size of the wire material in the direction of the coil axis O. That is, the wire height h is obtained by dividing the diameter d of the wire material in the active coil portion 13 by cos θ, when θ is defined as a lead angle.

In the shown example, as described above, the wire material gap is a maximum at the central portion of the coil springs 1a and 1b in the direction of the coil axis O, and gradually decreases toward the outer side in the direction of the coil axis O. Therefore, the lead angle is not constant over the active coil portion 13, and the wire height h is also not constant. The direct below gap Sb is smaller than the minimum value of the wire height h in the active coil portion 13.

The direct below gap Sb is smaller than the diameter d of the wire material in the active coil portion 13. The direct below gap Sb may be equal to or larger than the diameter d of the wire material in the active coil portion 13.

At the end portion of the coil springs 1a and 1b in the direction of the coil axis O, a wire material gap (hereinafter referred to as an "end portion gap") Sc formed between a portion extending around the coil axis O from the corresponding portion 11 to the distal end portion w1 side of the wire material and the adjacent wire material 14 on the inner side in the direction of the coil axis O gradually decreases from the corresponding portion 11 toward the distal end portion w1 of the wire material around the coil axis O.

As described above, according to the coil springs 1a and 1b of the present embodiment, the direct below gap Sb is smaller than the wire height h in the active coil portion 13. Therefore, even if the corresponding portion 11 of one coil spring 1a intends to enter the wire material gap of the other coil spring 1b, the wire material in the active coil portion 13 of the other coil spring 1b interferes with at least one of the corresponding portion 11 of the one coil spring 1a and the wire materials 12 of the one coil spring 1a adjacent to the corresponding portion 11 on the inner side in the direction of the coil axis O.

This makes it possible to prevent the wire material in the active coil portion 13 of the other coil spring 1b from deeply entering the end portion gap Sc in the one coil spring 1a through the direct below gap Sb in the one coil spring 1a. As a result, it is possible to prevent the wire material in the active coil portion 13 of the other coil spring 1b from being strongly caught from both sides in the direction of the coil axis O by the portion of the wire materials of the one coil spring 1a defining the end portion gap Sc, and from being hard to extract. Thus, it is possible to prevent occurrence of entanglement of the coil springs, without increasing the length of the wire material and forming a plurality of densely winding portions or the like on the coil spring.

Further, in the present embodiment, since the coil springs 1a and 1b are closed end springs, the above-described actions and effects are significantly successful. Further, since the corresponding portion 11 is formed by a pair of wire materials adjacent to each other in the direction of the coil axis O, the length of the wire material can be reliably suppressed.

It should be noted that the technical scope of the present invention is not limited to the above-described embodiments, and various modifications can be made within the scope that does not depart from the spirit of the present invention.

For example, in the above embodiment, the configuration in which the adjacent wire materials in the direction of the coil axis O abut each other is shown for the corresponding portion 11. However, as the corresponding portion, a configuration in which the adjacent wire materials in the direction of the coil axis O are separated from each other in the direction of the coil axis O may be adopted.

Besides, it is possible to appropriately replace the constituent elements in the above-described embodiment with well-known constituent elements and the above-described modification examples may be combined as appropriate within the scope that does not depart from the gist of the present invention.

INDUSTRIAL APPLICABILITY

According to the coil spring of the present invention, mutual entanglement can be prevented without increasing the weight or cost.

REFERENCE SIGNS LIST 1a, 1b Coil spring
11 Corresponding portion
13 Active coil portion
H Wire height
O Coil axis
Sa Maximum value
Sb Direct below gap (gap)
Sc End portion gap (gap)
W1 Distal end portion

The invention claimed is:

1. A coil spring formed by winding a wire material around a coil axis, the coil spring comprising:
   a corresponding portion provided at an end portion of the coil spring in a direction of the coil axis, the corresponding portion having an outer end edge and an inner end edge, the outer end edge defining an outermost edge of the coil spring in the direction of the coil axis, the inner end edge defining a farthest edge of the corresponding portion from the outer end edge at a point 360° n (n is an integer of 1 or more) away from the outer end edge,
   the corresponding portion having a whole size, which is a size in the direction of the coil axis from the outer end edge to the inner end edge equal to a maximum value of a gap between adjacent portions of the wire material adjacent to each other in the direction of the coil axis of the coil spring, the gap being a shortest distance in the direction of the coil axis between the adjacent portions of the wire material,
   wherein a gap in the direction of the coil axis between the corresponding portion and a first portion of the wire material adjacent to the corresponding portion on the inner side in the direction of the coil axis is smaller than a wire height in an active coil portion of the coil spring, and
   at the end portion in the direction of the coil axis, a gap in the direction of the coil axis between a second portion of the wire material extending around the coil axis from the corresponding portion to a distal end portion side of the wire material and a third portion of the wire material adjacent to the second portion on the inner side in the direction of the coil axis gradually decreases from the corresponding portion toward the distal end portion side of the wire material around the coil axis.

2. The coil spring according to claim 1, wherein the coil spring is a closed end spring in which the distal end portion of the wire material overlaps a portion of the wire material adjacent to the distal end portion on the inner side in the direction of the coil axis, and
the corresponding portion is formed by a pair of portions of the wire material adjacent to each other in the direction of the coil axis.

3. The coil spring according to claim 1, wherein
the corresponding portion is provided at each of both end portions of the coil spring, and the gap in the direction of the coil axis between the corresponding portion and the first portion, which is smaller than the wire height in the active coil portion of the coil spring, is provided at each of both end portions of the coil spring, and the gap in the direction of the coil axis between the second portion and the third portion, which gradually decreases from the corresponding portion toward the distal end portion side, is provided at each of both end portions of the coil spring.

4. The coil spring according to claim 1, wherein a fourth portion of the wire material between the distal end edge to 180° or more therefrom around the coil axis abuts and overlaps a fifth portion of the wire material adjacent to the fourth portion on the inner side in the direction of the coil axis.

5. The coil spring according to claim 1, wherein the corresponding portion has a separate portion in which portions of the wire material adjacent to each other in the direction of the coil axis are separated from each other in the direction of the coil axis.

* * * * *